United States Patent [19]
Nakaho

[11] 4,448,488
[45] May 15, 1984

[54] TILTING DEVICE FOR USE IN ANTI-GLARE MIRROR

[75] Inventor: Junichi Nakaho, Ichinomiya, Japan

[73] Assignee: Kabushiki Kaisha Tokai Rika Denki Seisakusho, Aichi, Japan

[21] Appl. No.: 424,497

[22] Filed: Sep. 27, 1982

[30] Foreign Application Priority Data

Feb. 19, 1982 [JP] Japan ................ 57-23462[U]

[51] Int. Cl.³ .................... G02B 17/00; F16C 1/10
[52] U.S. Cl. .................... 350/278; 350/281; 350/279; 74/501 M
[58] Field of Search .......... 350/278, 279, 281; 74/471, 501, 501 M

[56] References Cited
U.S. PATENT DOCUMENTS 4,150,585  4/1979  Manzoni ................ 74/501 M Primary Examiner—John K. Corbin
Assistant Examiner—P. M. Dzierzynski
Attorney, Agent, or Firm—Jackson, Jones & Price

[57] ABSTRACT

A tilting device for use in an anti-glare mirror including a prism mirror, a plate for holding the prism mirror, and a casing for accommodating the prism mirror and the plate in it. The tilting device includes a contact projection mounted on the plate, a spring for urging the plate and the prism mirror, a rotary member having a cam face formed on its one face, and a reversible motor for driving the rotary member such that the prism mirror is changed over to either one of a normal position and an anti-glare position.

5 Claims, 6 Drawing Figures

TILTING DEVICE FOR USE IN ANTI-GLARE MIRROR

BACKGROUND OF THE INVENTION

The present invention generally relates to an anti-glare mirror used as a room mirror of a motor vehicle and having a prism mirror incorporated therein, and more particularly, to a tilting device for use in the anti-glare mirror, by which the prism mirror is automatically changed over between a normal position and an anti-glare position.

Conventionally, in room mirrors employed in motor vehicles and each provided with a prism mirror having a front face and a rear face acting as a reflecting surface, with a reflectance of the front face being smaller than that of the reflecting surface, it has been generally so arranged that, in the case where dazzling light rays from succeeding motor vehicles are reflected at night, etc. by the reflecting surface provided on the rear face of the prism mirror disposed at the normal position, the prism mirror is automatically tilted to the anti-glare position such that light rays reflected from the front face of the prism mirror are led towards eyes of a driver of the motor vehicle so as to free the driver from the dazzling light rays.

Conventionally, in tilting devices for use in the anti-glare mirrors of the above described type, it has been so arranged that two permanent magnets are secured to a rear face of a mirror mounting plate supported pivotally in a mirror casing, while two electromagnets are provided on the mirror casing so as to confront the two permanent magnets, respectively, whereby the prism mirror is pivoted to either one of a normal position and an anti-glare position through electromagnetic attraction and repulsion in response to electrical magnetization of the electromagnets.

However, the known tilting devices of the above described constructions have such an inconvenience that, in the case where the prism mirror is pivoted, a collision of the permanent magnet with the electromagnet through attraction therebetween produces a loud and harsh noise. Furthermore, the prior art tilting devices have such a disadvantage that, although a high precision is required for tilting angles of the prism mirror so as to minimize a positional difference between an image reflected by the prism mirror disposed at the normal position and an image reflected by the prism mirror disposed at the anti-glare position, it is quite difficult to obtain an accurate tilting angle thereof due to deviations in the dimensions of the permanent magnets, electromagnets, etc. during manufacture.

SUMMARY OF THE INVENTION

Accordingly, an essential object of the present invention is to provide an improved tilting device for use in an anti-glare mirror provided with a prism mirror having a normal position and an anti-glare position, in which a tilting angle of the prism mirror can be set with high precision, and a positional difference between an image reflected by the prism mirror disposed at the normal position and an image reflected by the prism mirror disposed at the anti-glare position can be substantially eliminated, with substantial elimination of the disadvantages inherent in conventional tilting devices of this kind.

Another important object of the present invention is to provide an improved tilting device of the above described type which does not produce a loud-noise.

Still another object of the present invention is to provide an improved tilting device of the above described type which is simple in structure, highly reliable in actual use, suitable for mass production at low cost, and can be readily incorporated into room mirrors of motor vehicles and the like at low cost.

In accomplishing these and other objects according to one preferred embodiment of the present invention, there is provided an improved tilting device for use in an anti-glare mirror including a prism mirror, a plate for holding said prism mirror fixedly secured thereto, and a casing, with the plate being accommodated in said casing together with said prism mirror, said tilting device arranged to support said plate such that said plate is tiltable together with said prism mirror in a forward direction and in a rearward direction of said casing about a horizontal rotational axis in said casing, and comprising:

a contact projection which is mounted at a predetermined position on a rear face of said plate such that the predetermined position is disposed above or below said horizontal rotational axis;

a spring for urging said plate and said prism mirror about the horizontal rotational axis;

a rotary member having a cam face formed on one face thereof, which is rotatably provided at a position in said casing so as to confront said contact projection such that said contact projection is brought into sliding contact with said cam face with said one face extending in a radial direction of said rotary member;

said cam face comprising a first plane, a second plane, and a spirally inclined face interposed between said first plane and said second plane such that said first plane, said spirally inclined face and said second plane are arranged in a circumferential direction of said rotary member so as to form a circle with said first plane being different, in level in an axial direction of said rotary member, from said second plane; and a reversible motor for driving said rotary member, which is provided in said casing;

whereby when said rotary member is rotated upon forward rotation or reverse rotation of said reversible motor, said contact projection is selectively brought into pressure contact with said first plane and said second plane such that said prism mirror is changed over to either one of two positions in the forward direction and in the rearward direction of said casing.

In accordance with the present invention, the tilting angle of the prism mirror can be set with high precision and a positional difference between an image reflected by the prism mirror disposed at the normal position and an image reflected by the prism mirror disposed at the anti-glare position can be eliminated.

BRIEF DESCRIPTION OF THE DRAWINGS

These and other objects and features of the present invention will become apprent to from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
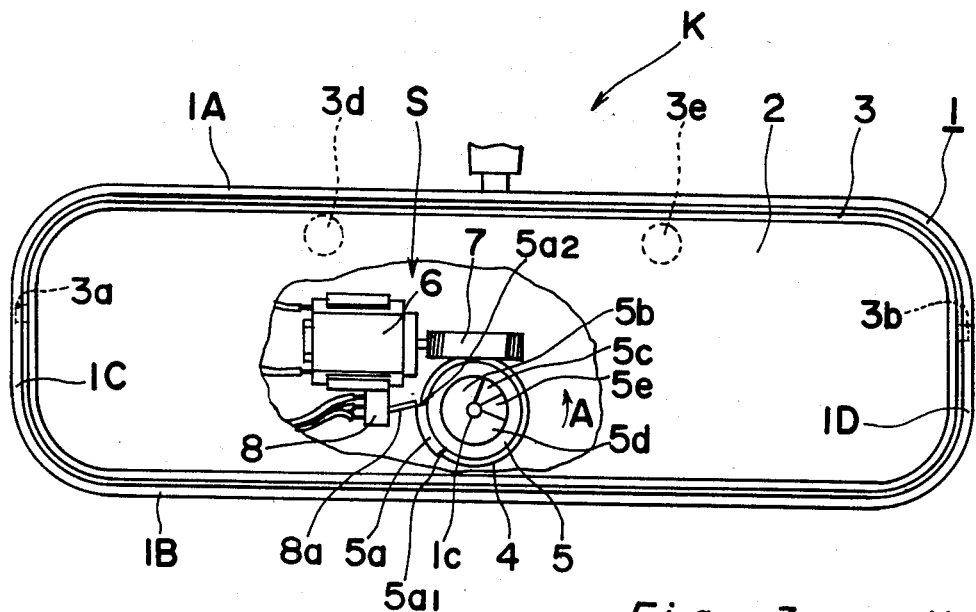
FIG. 1 is a partially cutaway front elevational view of an anti-glare mirror provided with a prism mirror, in which a tilting device according to the present invention is incorporated.

Referring now to the drawings, there is shown in FIGS. 1 to 3, 5 and 6, an anti-glare mirror K in which a tilting device S according to one preferred embodiment of the present invention is incorporated.

The anti-glare mirror K includes a mirror casing 1, a prism mirror 2 and a mirror mounting plate 3. The prism mirror 2 of a substantially rectangular shape has a front face 2a, a rear face 2b acting as a reflecting surface thereof, a top face 2c and a bottom face 2d. The front face 2a is inclined with respect to the rear face 2b so as to extend from the top face 2c to the bottom face 2d in a direction toward the rear face 2b.

It is to be noted here that all directional indications such as "front", "rear", "top", etc. relate to the illustration in FIG. 1, hereinbelow.

The mirror mounting plate 3 has a rectangular shape and includes a pair of lugs 3a and 3b which are, respectively, formed on a left side edge and a right side edge thereof so as to extend horizontally in opposite directions and in alignment with each other, whereby a line connecting an axis of the lug 3a and that of the lug 3b constitutes a horizontal rotational axis 1 of the mirror mounting casing 3 as described later. Furthermore, the mirror mounting plate 3 has a contact projection 3c formed below the horizontal rotational axis 1 on one face thereof, and a pair of circular protrusions 3d and 3e formed above the horizontal rotational axis 1 on the one face such that the circular protrusions 3d and 3e are separated a predetermined distance from each other in a horizontal direction of the mirror mounting plate 3.

The mirror casing 1 is formed into a box-like configuration and has a top wall 1A, a bottom wall 1B, a left side wall 1C, a right side wall 1D and a rear side wall 1E such that an accommodation recess 1F is formed at a front face of the mirror casing 1. The mirror casing 1 has a pair of holes 1a and 1b which are, respectively, formed on the left side wall 1C and the right side wall 1D so as to extend horizontally in alignment with each other. It should be noted that a line connecting an axis of the hole 1a and that of the hole 1b acts as the horizontal rotational axis 1 for the mirror mounting plate 3 as described later. Furthermore, the mirror casing 1 has a shaft 1c formed at a lower central portion on an inner surface of the rear side wall 1E. Moreover, the mirror casing 1 has a pair of spring supports 1d and 1e which are formed on the inner surface of the rear side wall 1E so as to abut on an inner surface of the top wall 1A such that the spring supports 1d and 1e are separated a predetermined distance from each other in a horizontal direction of the mirror casing 1.

The prism mirror 2 is fixedly secured to the mirror mounting plate 3 such that the rear face 2b of the prism mirror 2 is brought into contact with the other face of the mirror mounting plate 3 with the one face of the mirror mounting plate 3 being formed with the contact projection 3c and the pair of the circular protrusions 3d and 3e as described above. Then, the pair of the lugs 3a and 3b of the mirror mounting plate 3 are rotatably inserted into the pair of the holes 1a and 1b of the mirror casing 1, respectively such that the front face 2a of the prism mirror 2 is directed forward, i.e. in a direction remote from the rear side wall 1E of the mirror casing 1, so that the contact projection 3c formed on the rear face of the mirror mounting plate 3 confronts the shaft 1c formed on the inner surface of the rear side wall 1E and further, the pair of the circular protrusions 3d and 3e formed on the rear face of the mirror mounting plate 3 confront the pair of spring supports 1d and 1e formed on the inner surface of the rear side wall 1E, respectively, whereby the mirror mounting plate 3 is supported by the mirror casing 1 so as to be tiltable in the accommodation recess 1F in a forward direction and in a rearward direction of the mirror casing 1 about the horizontal rotational axis 1 constituted by the line connecting the axis of the hole 1a and that of the hole 1b.

The tilting device S includes the contact projection 3c, a worm wheel 4, a rotary member 5 having a cam face 5b formed on one end thereof, a reversible motor 6, a worm 7, a limit switch 8 and two compression springs 9.

The worm wheel 4 is rotatably mounted on the shaft 1c such that one end of the worm wheel 4 is in contact with the inner surface of the rear side wall 1E. Furthermore, the rotary member 5 is rotatably mounted on the shaft 1c such that the other end of the rotary member 5 remote from the cam face 5b is brought into contact with the other end of the worm wheel 4, so that the cam face 5b is directed forward.

A reversible motor 6 is secured to the inner surface of the rear side wall 1E so as to be disposed at the left side of the worm wheel 4 in FIG. 1 such that the worm 7 coupled with an output shaft of the reversible motor 6 is meshed with the worm wheel 4, whereby the worm wheel 4 is rotated upon drive of the reversible motor 6.

Meanwhile, a limit switch 8 having a lever 8a formed at one end thereof is provided on one side face of the reversible motor 6 such that the lever 8a is brought into or out of contact with a circumferential projection 5a formed on a circumferential periphery of the rotary member 5. The circumferential projection 5a has a pair of contact faces 5a1 and 5a2 formed at opposite circumferential ends thereof. Moreover, the two compression springs 9 are, respectively, provided between the spring support 1d and the circular protrusion 3d and between the spring support 1e and the circular protrusion 3e so as to urge the mirror mounting plate 3, i.e. the prism mirror 2 forward, so that the contact projection 3c is brought into pressure contact with the cam face 5b of the rotary member 5.

The cam face 5b formed on the one end of the rotary member 5 comprises a first plane 5c, a second plane 5d and a spirally inclined face 5e interposed between the first plane 5c and the second plane 5d such that the first plane 5c, spirally inclined face 5e and second face 5d are arranged in a circumferential direction of the rotary member 5 so as to form a circle. It is to be noted that the second plane 5d is disposed higher, in level from the other end of the rotary member 5 remote from the cam face 5b, than the first plane 5c. Accordingly, the second plane 5d is disposed forward of the first plane 5c in the mirror casing 1. In the above described arrangement of the cam face 5b, when the contact projection 3c is brought into sliding contact with the cam face 5b from the first plane 5c through the spirally inclined face 5e to the second plane 5d in response to rotation of the rotary member 5, the contact projection 3c is pushed forward and thus, the mirror mounting plate 3 is tilted rearward to an anti-glare position.

It should be noted here that, since a frictional torque produced between the rotary member 5 and the worm wheel 4 is set larger than a frictional torque produced between the cam face 5b and the contact projection 3c, the rotary member 5 frictionally coupled with the worm wheel 4 is rotated upon rotation of the worm wheel 4. Meanwhile, it is so arranged that, when the rotary member 5 is stopped by the lever 8a through contact therebetween, only the worm wheel 4 is allowed to rotate.

Moreover, it is to be noted that the reversible motor 6 is arranged to be operated by electric current fed from a decision circuit (not shown) connected to a sensor (not shown) for detecting external light reflected on the prism mirror 2.

Hereinbelow, operations of the tilting device S having the above described constructions will be described.

Figure 4:
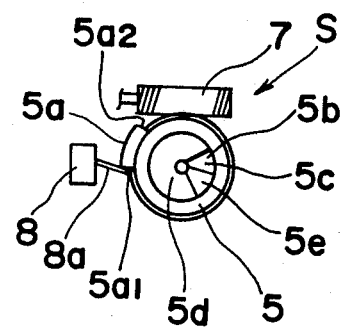
FIG. 4 is a view as observed in the direction of the arrow IV in FIG. 3.
Figure 5:
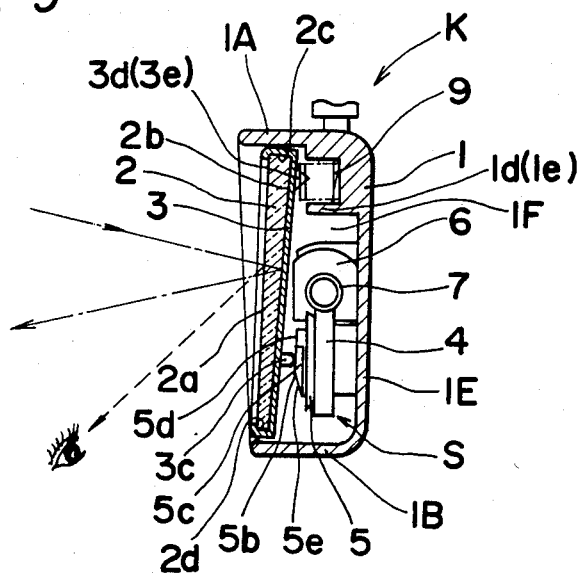
FIG. 5 is a view similar to FIG. 2, particularly showing the anti-glare mirror of FIG. 1 with the prism mirror being disposed at an anti-glare position.
Figure 6:
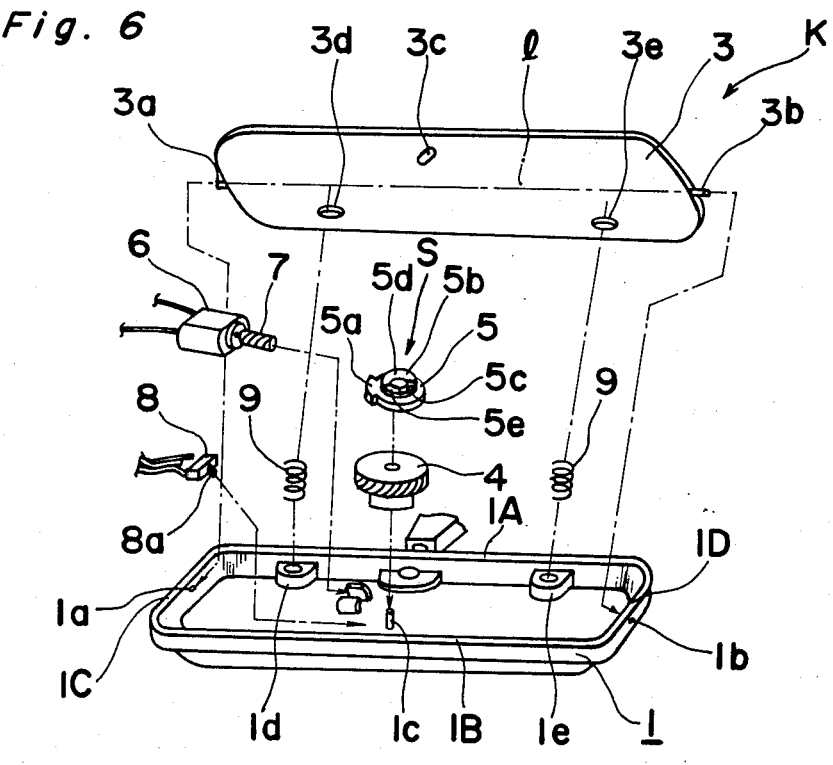
FIG. 6 is an exploded perspective view of the anti-glare mirror of FIG. 1.

In the case where the decision circuit has made a decision that the prism mirror 2 should be tilted to the anti-glare position when dazzling light rays from succeeding motor vehicles are reflected on the prism mirror 2 at night such that external light rays are detected by the sensor, electric current is fed from the decision circuit to the reversible motor 6. Thus, when the reversible motor 6 is rotated forward, the worm wheel 4 is rotated in the direction of the arrow A in FIG. 1 through the worm 7 and thus, the rotary member 5 frictionally coupled with the worm wheel 4 is rotated together with the worm wheel 4 in the direction of the arrow A. Thus, the contact projection 3c adapted to be in contact with the cam face 5b is caused to proceed from the first plane 5c through the spirally inclined face 5e to the second plane 5d in contact therewith, so that a lower portion of the mirror mounting plate 3 is pushed forward and thus, an upper portion of the mirror mounting plate 3 is pushed rearward against an urging force of the compression springs 9, whereby the prism mirror 2 is tilted rearward together with the mirror mounting plate 3 to the anti-glare position. At the moment when the contact projection 3c is displaced to the second plane 5d, the contact face 5a1 of the circumferential projection 5a is brought into contact with the lever 8a of the limit switch 8 as shown in FIG. 4 and thus, a power source of the reversible motor 6 is shut down by the limit switch 8. Rotation of the reversible motor 6 may not be stopped immediately due to inertia of the reversible motor 6. However, in that case, rotation of the rotary member 5 is forcibly stopped through contact between the circumferential projection 5a and the lever 8a and at the same time, slip takes place between the rotary member 5 and the worm wheel 4 so that a great force may not be applied to the limit switch 8. When the prism mirror 2 is tilted rearward so as to be displaced from a normal position shown in FIG. 2 to the anti-glare position shown in FIG. 5 as described above, incident light is reflected by the front face 2a having a reflectance smaller than that of the rear face 2b acting as the reflecting surface of the prism mirror 2 as shown in one-dot chain lines in FIG. 5 and thus, quantity of light is reduced as compared with that reflected by the rear face 2b, whereby the dazzling light rays are prevented from proceeding into eyes of a driver of the motor vehicle.

Figure 2:
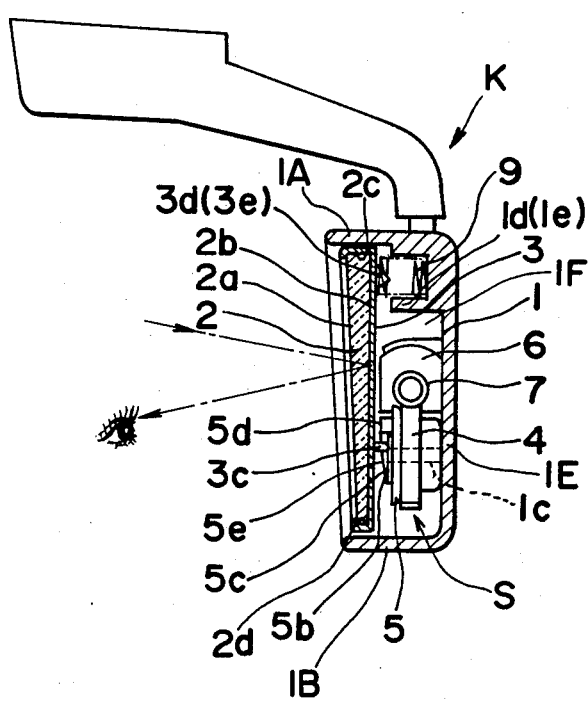
FIG. 2 is a cross-sectional view of the anti-glare mirror of FIG. 1 with the prism mirror being disposed at a normal position.
Figure 3:
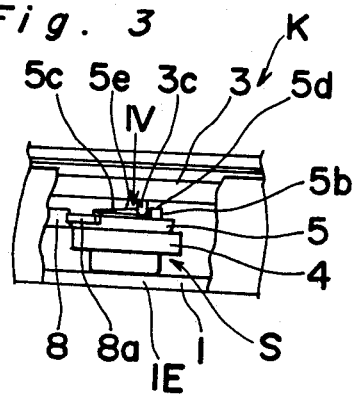
FIG. 3 is a cutaway fragmentary bottom plan view of the anti-glare mirror of FIG. 1, particularly showing engagement of components of the tilting device of FIG. 1.

On the other hand, in the case where the decision circuit connected to the sensor has made a decision that the prism mirror 2 should be returned to the normal position, electric current is caused to flow from the decision circuit to the reversible motor 6 in a direction opposite to that of the above described case, so that the worm wheel 4 and the rotary member 5 are rotated in a direction opposite to the arrow A. Accordingly, the contact projection 3c is caused to proceed from the second plane 5d through the spirally inclined face 5e to the first plane 5c and thus, the mirror mounting plate 3 is returned back to the initial normal position shown in FIG. 2 by the urging force of the compression springs 9. At the moment when the contact projection 3c is displaced to the first plane 5c, the contact face 5a2 of the circumferential projection 5a is brought into contact with the lever 8a of the limit switch 8 as shown in FIG. 1 and thus, the power source of the reversible motor 6 is shut down by the limit switch 8. Thus, the prism mirror 2 has been displaced to the normal position as shown in FIG. 2. At the normal position, incident light is reflected by the rear face 2b acting as the reflecting surface of the prism mirror 2 and thus, the anti-glare effect of the anti-glare mirror K is lost.

It should be noted here that the present invention is not limited to the above described embodiment. For example, the limit switch 8 can be replaced by a stopper member formed on the cam face 5b of the rotary member 5 so that electric current may flow through the reversible motor 6 for a time period slightly longer than that required for rotating the rotary member 5.

As is clear from the foregoing, in the tilting device for use in the anti-glare mirror, according to the present invention, the contact projection formed on the mirror mounting plate fixedly secured to the prism mirror is brought into contact with the first plane, the second plane and the spirally inclined face interposed between the first plane and the second plane of the cam face formed on the rotary member such that the contact projection is caused to proceed from the first plane through the spirally inclined face to the second plane or vice versa.

Accordingly, in accordance with the present invention, the prism mirror can be automatically changed over between the anti-glare position and the normal position with much ease. Furthermore, in accordance with the present invention, since the tilting angle of the prism mirror mainly depends on a level difference between the first plane and the second plane, the tilting angle can be set with high precision and a positional difference between an image reflected by the prism mirror disposed at the normal position and an image reflected by the prism mirror disposed at the anti-glare position can be eliminated. Moreover, in accordance with the present invention, the tilting device does not produce a loud and harsh noise at the time of changeover for displacing the contact projection to the first plane and the second plane selectively upon rotation of the rotary member.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A tilting device for use in an anti-glare mirror including a prism mirror, a plate for holding said prism mirror fixedly secured thereto, and a casing, with the plate being accommodated in said casing together with said prism mirror, said tilting device arranged to support said plate such that said plate is tiltable together with said prism mirror in a forward direction and in a rearward direction of said casing about a horizontal rotational axis in said casing and comprising:

a contact projection which is mounted at a predetermined position on a rear face of said plate such that the predetermined position is disposed above or below said horizontal rotational axis;

a spring for urging said plate and said prism mirror about the horizontal rotational axis;

a rotary member having a cam face formed on one face thereof, which is rotatably provided at a position in said casing so as to confront said contact projection such that said contact projection is brought into sliding contact with said cam face with said one face extending in a radial direction of said rotary member;

said cam face comprising a first plane, a second plane, and a spirally inclined face interposed between said first plane and said second plane such that said first plane, said spirally inclined face and said second plane are arranged in a circumferential direction of said rotary member so as to form a circle with said first plane being different, in level, in an axial direction of said rotary member, from said second plane; and a reversible motor for driving said rotary member, which is provided in said casing;

whereby when said rotary member is rotated upon forward rotation or reverse rotation of said reversible motor, said contact projection is selectively brought into pressure contact with said first plane and said second plane such that said prism mirror is changed over to either one of two positions in the forward direction and in the rearward direction of said casing.

2. A tilting device as claimed in claim 1, further including a clutch mechanism provided between said rotary member and said reversible motor.

3. A tilting device as claimed in claim 1, wherein a limit switch for turning on or off said reversible motor is provided so as to stop said rotary member at predetermined positions.

4. A tilting device as claimed in claim 2, wherein a limit switch for turning on or off said reversible motor is provided so as to stop said rotary member at predetermined positions.

5. A tilting device as claimed in claim 2, further including a stopper member formed on said cam face so as to stop rotation of said rotary member through contact of said contact projection by said stopper member, said reversible motor being arranged to be supplied with electric power for a time period slightly longer than that required for said contact projection to come into contact with said stopper member and being caused to run idle by said clutch mechanism after contact of said contact projection by said stopper member.

* * * * *